United States Statutory Invention Registration [19]

[11] Reg. Number: H148

Thompson [43] Published: Nov. 4, 1986

[54] SHOCK ELECTROMECHANICAL ENERGY CONVERTER WITH PERMANENT MAGNET

[75] Inventor: James K. Thompson, Columbus, Ohio

[73] Assignee: The United States of America as represented by the Secretary of the Army, Washington, D.C.

[21] Appl. No.: 628,096

[22] Filed: Jul. 5, 1984

[51] Int. Cl.[4] ..... H02K 1/00; G21B 1/00

[52] U.S. Cl. ..... 89/8; 307/106; 310/10

[58] Field of Search ..... 89/8; 310/10, 11; 102/200, 206, 207, 202.5, 202.7, 293; 376/125, 144, 145; 307/106-108; 328/1

[56] References Cited

U.S. PATENT DOCUMENTS

| | | | |
|---|---|---|---|
| 3,224,337 | 12/1965 | Ford et al. | 89/8 |
| 3,254,564 | 6/1966 | Morley et al. | 89/8 |
| 3,295,412 | 1/1967 | Morley et al. | 89/8 |
| 3,356,869 | 12/1967 | Hilton et al. | 310/10 |
| 3,478,231 | 11/1969 | Knoepfel et al. | 89/8 X |
| 3,484,627 | 12/1969 | Conger et al. | 89/8 X |
| 3,522,459 | 8/1970 | Stubbs et al. | 89/8 X |
| 3,985,078 | 10/1976 | Hart et al. | 89/8 X |
| 4,334,474 | 6/1982 | Coltharp | 102/206 |
| 4,370,576 | 1/1983 | Forster, Jr. et al. | 310/10 |
| 4,449,441 | 5/1984 | McAllister | 89/8 |

FOREIGN PATENT DOCUMENTS

| | | | |
|---|---|---|---|
| 2141215 | 12/1984 | United Kingdom | 89/8 |

OTHER PUBLICATIONS

R. S. Caird et al, "Explosive Magnetic Flux Compression Plate Generators as Fast High-Energy Power Sources", IEEE Conf., Lubbock, Tex. (11/11/76), 6 pages.

C. M. Fowler, "Explosive Flux Compression Generators for Rail Gun Power Sources", IEEE Transactions on Magnetics, vol. 18 No. 1, Jan. 82, pp. 64-67.

*Primary Examiner*—David H. Brown
*Assistant Examiner*—John E. Griffiths
*Attorney, Agent, or Firm*—Robert C. Sims; Fred M. Bush; Anthony T. Lane

[57] ABSTRACT

An explosively operated device by which a strong magnetic field pulse and an electric current pulse of microseconds duration is produced. A cylindrical magnet is used to initiate the field, and its energy source is an explosive filled metal tube. Within the converter itself, the lines of magnetic flux are essentially axial. When an explosive charge in the central tube is detonated, the end of the tube flares radially, and the tube begins to expand along its length. As it does so, the tube compresses the magnetic field against the inner surface of a magnet. Simultaneously, a helical coil inside the converter experiences a rapid increase in flux density, thus satisfying Faraday's law. This interaction causes a pulse of electric current to be fed into the turns of the magnetocumulative generator as its initial magnetic field is maximized. As the central tube expands against the inside of the coil, it shorts out the turns one-by-one as the detonation wave travels axially along the converter. This action progressively reduces the inductance of the circuit, thus increasing the current output of the converter.

7 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

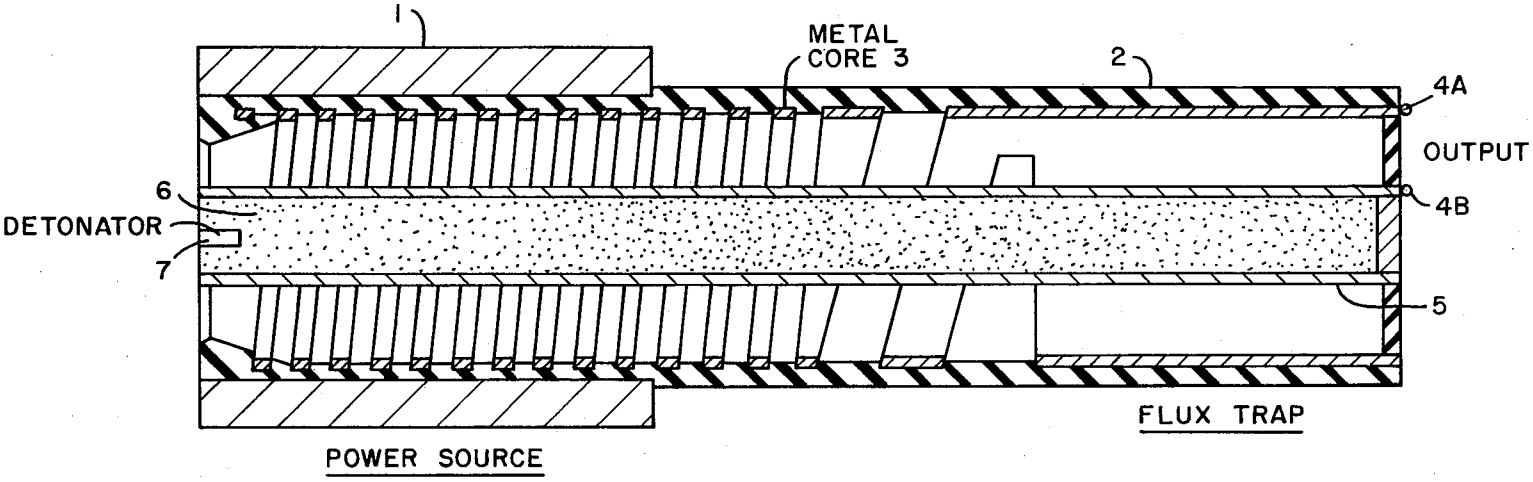
4A
OUTPUT
4B
5
FLUX TRAP
2
METAL CORE 3
1
POWER SOURCE
6
7
DETONATOR

SHOCK ELECTROMECHANICAL ENERGY CONVERTER WITH PERMANENT MAGNET

DEDICATORY CLAUSE

The invention described herein may was made in the course of or under a contract or subcontract thereunder with the Government and may be manufactured, used, and licensed by or for the Government for governmental purposes without the payment to me of any royalties thereon.

SUMMARY OF THE INVENTION

The invention is an explosively operated device by which a strong magnetic field pulse and an electric current pulse can be produced of microseconds duration. The device utilizes a cylindrical magnet to initiate the field, and its energy source is an explosive charge. Within the converter itself, the lines of magnetic flux are essentially axial. When the explosive charge in the central metal tube is detonated, the end of the tube flares radially, and the tube begins to expand along its length. As it does so, the tube compresses the magnetic field against the inner surface of the magnet. Simultaneously, the helical coil inside the converter experiences a rapid increase in flux density, thus satisfying Faraday's law. This interaction causes a pulse of electric current to be fed into the turns of the magnetocumulative generator, as its initial magnetic field is maximized. As the central tube expands against the inside of the coil, it shorts out the turns one-by-one as the detonation wave travels axially along the converter. This action progressively reduces the inductance of the circuit, thus increasing the current output of the converter.

This invention can be used in a number of applications in which moderate pulsed power outputs are required in combination with a strong, pulsed magnetic field (greater than can be obtained with a conventional electromagnet). Examples of applications are: special types of chargedparticle accelerators, magnetic traps for charged particles, containment and compression of flowing plasma (MHD and controlled fusion studies), and pulsed electromagnetic

BRIEF DESCRIPTION OF THE DRAWING

The single FIGURE is a diagrammatic showing of the present invention in cross-section.

DESCRIPTION OF THE BEST MODE AND PREFERRED EMBODIMENT

The single FIGURE shows a permanent magnet 1 which is cylindrical in shape and causes the electromagnetic flux to be essentially axial throughout the insulated casing 2. A conducting metal coil 3 is wound inside the insulating casing 3 and is connected to output terminal 4A at its right-hand end. The other output terminal 4B is connected to the right-hand end of a metal tube 5. The metal tube 5 is filled with an explosive 6 which may be of any conventional explosive. A detonator 7 is provided for igniting the explosive 6 at the left-hand end of tube 5. Tube 5 should be made of a metal having good electrical conductivity and good ductility (aluminum, etc.).

When the detonator 7 is fired, the explosive at the lefthand end of the tube will cause the left side of the tube to flare out and in a conical shape until it reaches coil 3 and insulating casing 2. When the left side of the tube 5 contacts the left side of metal coil 3, an electrical connection is made for providing current to the output terminals 4A and 4B. As the tube 5 is flared out from left to right by the explosive charge (also traveling from left to right), the magnetic field is compressed against the inner surface of the coil and the permanent magnet.

The compression of the magnetic field is due to the radial movement of the tube. The end of the tube 5 where the explosion is initiated is flared into a conical shape and this process continues down the length of the tube as the explosion progresses. Therefore, the turns of coil 3 are shorted out one-by-one by the perimeter of the cone as it is pressed along the inside of casing 2.

The current output of the device is coupled between the metal coil and the explosive-filled tube at the "rear" end of the device. The output or load circuit is shown schematically at the right-hand end of the device. In this application, the metal coil is flared to a wide sheet at the right side of the figure in order to more efficiently convert the current direction from circumferential (in the coil) to axial (around the flux trap). The right side of the figure shows one type of magnetocumulative generator (MCG) which can be used in the field of high-energy physics.

As the number of unshorted turns of coil 3 decreases, so does the inductance L of the coil. The current I is proportional to the magnetic flux Φ divided by the inductance; i.e., $$I \approx \Phi / L.$$

Since rapid deformation of the tube leads to conservation of the magnetic flux, Φ remains constant and the drop in the inductance leads to increase in the current. Note that while the total magnetic flux Φ in the vicinity of the coil remains constant, the *flux denisty* is changed rapidly by the confining action of the expanding tube, and this causes a corresponding flow of current in the coil (increased by the drop in inductance).

I claim:

1. A device comprising an electrical coil formed about an axis and having a plurality of turns; said coil having a first end and a second end; first means for causing a magnetic flux to flow through said coil along said axis; second means for causing said magnetic flux to pulse for a short duration of time; and third means for causing the turns of said coil to be shorted out one-by-one during the duration of time said magnetic field is pulsed.

2. A device as set forth in claim 1 wherein said turns are shorted out one-by-one from the first end of the coil toward the second end of the coil; and output terminals connected between the second end of said coil and said third means.

3. A device as set forth in claim 1 wherein said second and third means comprise an electrically conducting tube positioned spacially inside said coil; said tube having a first and second end aligned with said first and second end of said coil; and fourth means inside of said conducting tube for causing said tube to rapidly expand towards and make contact with the turns of said coil from said first end progressively on down to said second end said coil, thereby causing the shorting of said turns by the contact of said conducting tube and the turns of said coil.

4. A device as set forth in claim 3 wherein said fourth means is an explosive charge located inside said tube; and said explosive charge being ignited at the first end of said tube so that the explosive charge will cause the expansion of said tube towards said coils from the first end towards the second end as an explosive wave travels from said first end to said second end of said tube.

5. A system as set forth in claim 4 further comprising output terminals connected between said second end of said coil and said second end of said tube.

6. A device as set forth in claim 5 wherein said first means is a cylindrical permanent magnet located about said coil

7. A device as set forth in claim 6 further comprising an insulating casing located outside and adjacent to said coil so as to allow said tube when expanded to make firm contact with the turns of said coil.

* * * * *